(12) United States Patent
Gardner et al.

(10) Patent No.: US 7,619,322 B2
(45) Date of Patent: Nov. 17, 2009

(54) TWO-WIRE POWER AND COMMUNICATIONS FOR IRRIGATION SYSTEMS

(75) Inventors: Randall James Gardner, Riverside, CA (US); Michael D. Heine, Corona, CA (US); John C. Dalman, Brea, CA (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 12/102,330

(22) Filed: Apr. 14, 2008

(65) Prior Publication Data

US 2008/0211307 A1 Sep. 4, 2008

Related U.S. Application Data

(63) Continuation of application No. 11/138,535, filed on May 25, 2005, now Pat. No. 7,358,626.

(60) Provisional application No. 60/574,899, filed on May 26, 2004.

(51) Int. Cl.
*H02J 3/14* (2006.01)
*H02J 3/34* (2006.01)
*G05D 11/00* (2006.01)

(52) U.S. Cl. .................. 307/40; 307/3; 340/310.11; 137/78.2; 700/284

(58) Field of Classification Search ............ 307/3, 307/40; 137/78.2, 78.3; 700/22, 284
See application file for complete search history.

(56) References Cited

U.S. PATENT DOCUMENTS

| 4,004,612 | A  | * | 1/1977 | Hummel et al. | ......... | 137/624.11 |
| 6,384,723 | B1 | * | 5/2002 | Keeler et al. | ................ | 340/513 |
| 6,766,221 | B1 | * | 7/2004 | Christiansen | ............... | 700/284 |
| 7,358,626 | B2 | * | 4/2008 | Gardner et al. | ................ | 307/40 |

* cited by examiner

*Primary Examiner*—Albert W Paladini
*Assistant Examiner*—Michael Rutland Wallis
(74) *Attorney, Agent, or Firm*—IP Group, Inc.

(57) ABSTRACT

A large number of irrigation system devices connected to a common two-wire cable can be powered and individually controlled from a central location by transmitting over the cable DC pulses of alternating polarity. Control information is conveyed by transmitting a command pulse train consisting of a series of pulses, separated by short no-power intervals, whose polarities indicate logic ones or zeros. Following a command pulse train, a selected watering station decoder acknowledges receipt of instructions by drawing current during a predetermined pulse of an alternating-polarity power pulse cycle, while a sensor decoder returns binary data by drawing current during one or the other of the alternating-polarity pulses of a series of power pulse cycles.

18 Claims, 7 Drawing Sheets

TWO-WIRE POWER AND COMMUNICATIONS FOR IRRIGATION SYSTEMS

RELATED APPLICATIONS

The present invention is a continuation of U.S. patent application Ser. No. 11/138,535 filed May 25, 2005, now U.S. Pat. No. 7,358,626 issued Apr. 15, 2008, entitled Two-Wire Power And Communications For Irrigation Systems, which claims benefit of U.S. Provisional Application No. 60/574,899, filed May 26, 2004, both of which are incorporated herein by reference.

FIELD OF THE INVENTION

This invention relates to the combined powering, control and monitoring of sprinklers or other components of an irrigation system over a single set of two wires. More particularly, the apparatus of this invention transmits a square wave pulse train from a central location to remote components by alternating the polarity of the two wires with respect to each other. The pulses provide operating power to the components and at the same time can form a code which selects and operates a desired component. Operation of the component is monitored at the central location by sensing momentary current changes in the wires.

BACKGROUND OF THE INVENTION

Large commercial irrigation systems such as those used on golf courses or croplands use sprinklers, sensors or other components which are normally powered from 24 V AC power lines that can be several miles long and can serve many hundreds of components. Various schemes have been proposed for powering and controlling the components of such a system with just two wires. For example, U.S. Pat. No. 3,521,130 to Davis et al., U.S. Pat. No. 3,723,827 to Griswold et al., and U.S. Pat. No. 4,241,375 to Ruggles disclose systems in which sprinklers along a cable are turned on in sequence by momentarily interrupting the power or transmitting an advance signal from time to time.

A problem with this approach is that it does not allow the operator to freely turn on or off any selected sprinkler or set of sprinklers at different times. This problem is usually resolved by providing separate controllers in the field to operate groups of sprinklers in accordance with a program stored in them, or transmitted to them by radio or other means. Alternatively, it has been proposed, as for example in U.S. Pat. No. 3,578,245 to Brock, to operate individual sprinkler sets from a central location by superimposing a frequency-modulated signal or DC pulses onto the 24 V AC power line. All of these approaches are expensive, and the latter may cause electrolysis problems that can damage the system in the long run.

Finally, a system with hundreds of sprinklers stretched out over miles using conventional electric water valves requires expensive heavy wiring to accommodate the hold-open current drawn by a large number of valves that may be watering simultaneously.

It is therefore desirable to provide an irrigation system in which individual components connected to a two-wire cable can be turned on and off (or, in the case of a sensor component, read) from a central location at minimal cost, with a minimal expenditure of electrical power, and without causing any significant electrolysis problems in the system. It is also desirable to have the ability in such a system to monitor the successful execution of the on-off command, or to return data to the central location, without additional apparatus.

OBJECTS AND SUMMARY OF THE INVENTION

The present invention provides a way to both power and control a large number of devices connected to a two-wire cable by energizing the cable with a square wave consisting of power pulses of alternating polarity. When a device operation is desired, the system transmits a command pulse train consisting of a series of pulses separated by short no-power intervals. The polarity of each pulse in that series indicates whether it is a 1 or a 0 in a binary device identification and/or action code. The DC power of one or the other polarity available on the cable during each power or command pulse powers the decoder circuitry of each device and powers the desired operation of the device. The presence of power on the cable allows the selected device to signal receipt of the instruction by drawing a burst of current during the first pulse following the end of a command train. Electrolysis problems are minimized by the fact that statistically, the number of pulses of one polarity is about equal to the number of pulses of the opposite polarity.

If the command is an interrogation of a sensor such as a flow, temperature, soil moisture or rain sensor, the sensor transmits data to the central location by drawing current during one of the pulses of each set of alternating-polarity pulses following the command train. Current draw during a pulse of a first polarity signifies a "1", while current draw during a pulse of the other polarity signifies a "0". The absence of any current draw following any command indicates a system or component failure and can be used to trigger an alarm.

The system of this invention is fail-safe in that a valve actuating capacitor is continuously charged except during the actual actuation of the associated water valve solenoid. If power is lost, the capacitor discharges through the solenoid and puts the valve into the "off" state. Additionally, the decoders of this invention can be set to predetermined run times by the command pulse train, whereupon they will automatically shut the watering station off upon expiration of the commanded time.

By using latching solenoids actuated by the discharge of an actuating capacitor, power consumption of the system is minimized, and wiring as small as 14 gauge can successfully be used for cable runs of several miles controlling hundreds of watering stations or other devices.

BRIEF DESCRIPTION OF THE DRAWINGS

FIG. 1b is a block diagram of the motherboard of FIG. 1a;

FIG. 3b is a partial circuit diagram of the watering station decoder of FIG. 3a;

DETAILED DESCRIPTION OF THE INVENTION

Figure 1A:
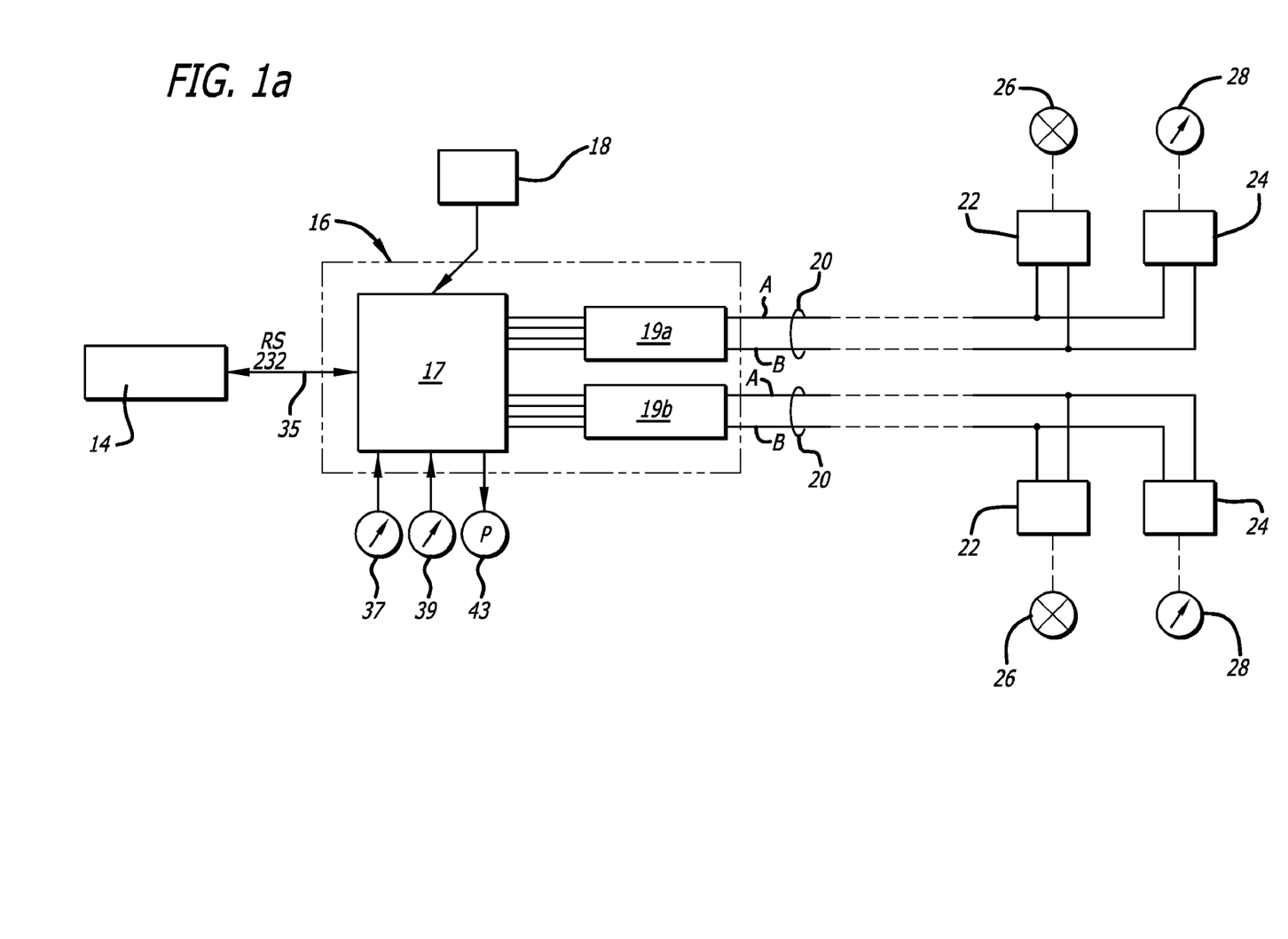
FIG. 1a is a block diagram showing the system of this invention.

FIG. 1a provides a general overview of the system 10 of this invention. An RS232 or other communication system 12 transmits action commands from a PC or other control unit 14 to a gateway 16, and receives acknowledgments or other device information from the gateway 16 for conveyance to the control unit 14. The gateway 16, which in the preferred embodiment contains a motherboard 17 and a pair of daughterboards 19a and 19b, receives power from a power source 18. As explained in more detail in connection with FIGS. 1b and 1c below, the function of the daughterboards 19a, b is to selectively apply, in the preferred embodiment, the following potentials to the wires A and B of their respective cables 20: 1) +40 VDC on A with respect to B; 2) +40 VDC on B with respect to A; or 3) an equal potential on both A and B. The daughterboards 19a, b are also equipped to detect current drawn by the decoders of the system, and to report that information to the control unit 14 through the motherboard 17. Device decoders such as watering station decoders 22 and sensor decoders 24 are connected in parallel to the wires A and B, and are arranged to operate the system components (e.g. water valves 26 or sensors 28) connected to them.

Figure 1B:
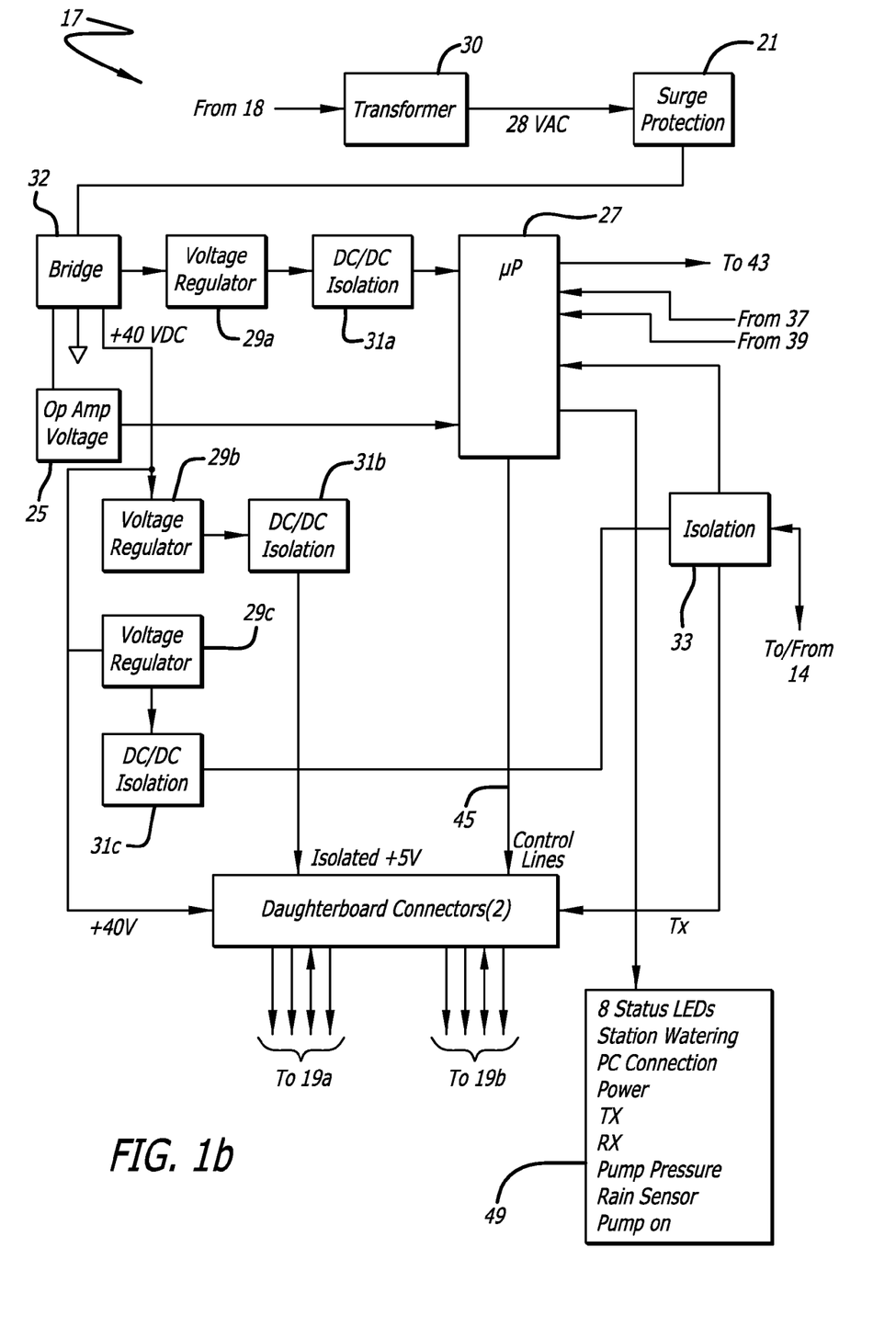

As best seen in FIG. 1b, the motherboard 17 is powered from a line transformer 30 that steps the commercial AC voltage down to 28 VAC. Following surge protection at 21 in the preferred embodiment, this is applied to a bridge rectifier 32 which converts the AC voltage to +40 VDC. This voltage is transmitted to the daughterboards 19a and 19b of FIG. 1c through connector 23. The output of bridge rectifier 32 is also applied to an operational amplifier 25 which provides incoming voltage information to the microprocessor 27. In addition, the output of bridge rectifier 32 is applied to three sets of voltage regulators 29a-c and isolation circuits 31a-c which provide isolated 5 VDC power to the microprocessor 27, the daughterboards 19a, b, and the two-way isolation circuitry 33, respectively.

The microprocessor 27 receives information from the control unit 14 through RS232 connector 35 as well as through an external pump pressure sensor 37 and an external rain sensor 39 (FIG. 1a). Its outputs include a pump start signal 41 that controls the irrigation system's water pumps 43, and a control signal 45 that operates the microprocessors 47 of the daughterboards 19a and 19b through the connector 23. The microprocessor 27 may also provide appropriate outputs to operate LED indicators 49 to convey status information such as Watering In Progress, PC Connection Live, Power On, Transmitting Data, Receiving Data, Pump Pressure Normal, Rain Sensed, and Pump On. A communication line (Tx) connects the microprocessor 47 (FIG. 1c) to the RS232 connector 35 through connector 23 and two-way isolation circuitry 33 for the transmission of commands and response data as described below.

Figure 1C:
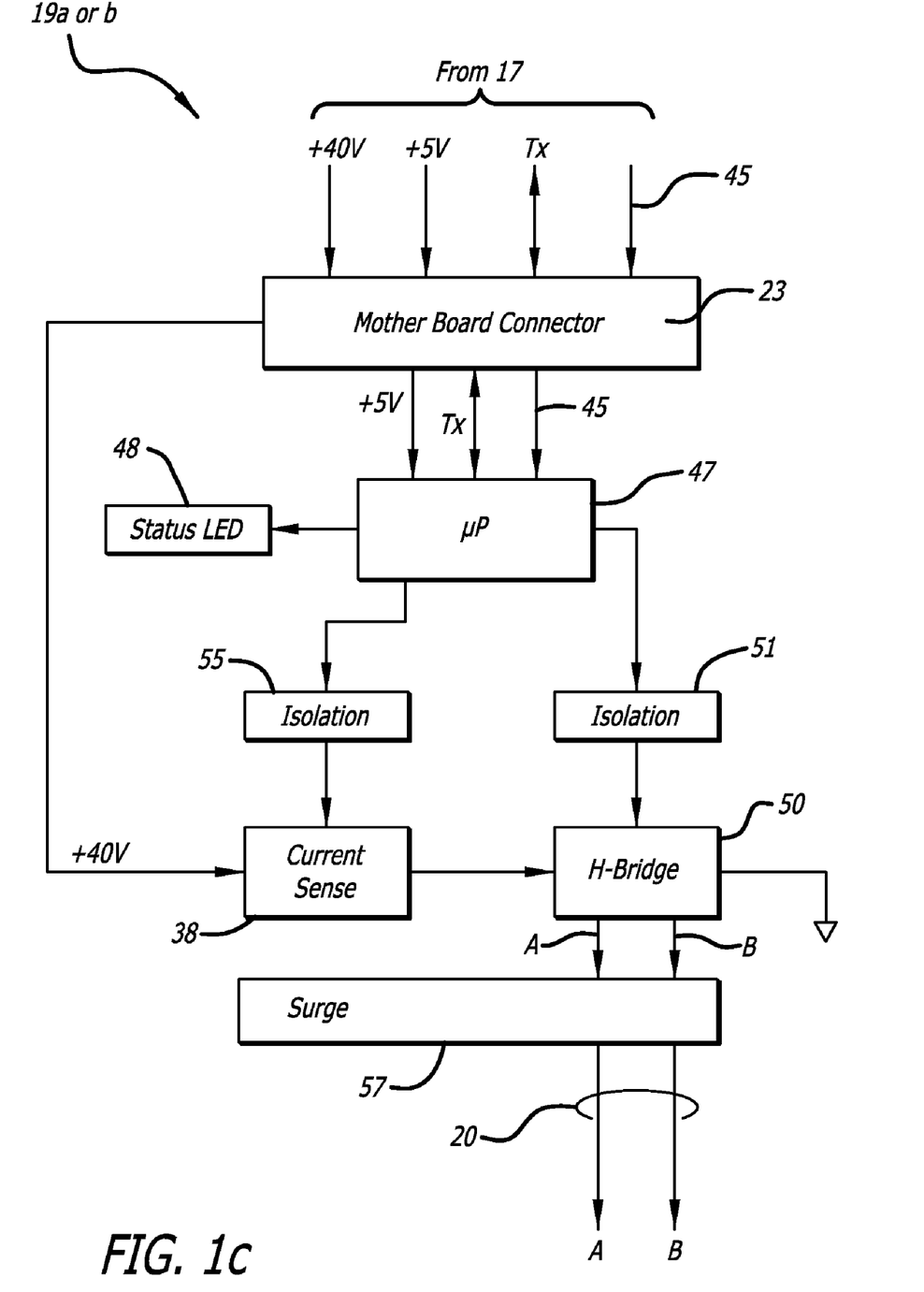
FIG. 1c is a block diagram of a daughterboard of FIG. 1b.

FIG. 1c shows the details of one of the two identical daughterboards 19a and 19b of FIG. 1a. The +40 VDC line of the connector 23 is applied through the current sensor 38 to a Four-transistor H bridge 50 which is switched by microprocessor 47, through an isolation circuit 51, into the three possible output states of A-positive-with-respect-to-B, B-positive-with-respect-to-A, and A-and-B-at-same-potential. These are the states required by the protocol described below.

A status LED 48 may be provided to monitor the operation of the microprocessor 47. The wires A and B are preferably connected to the decoder cable 20 through a surge protector 57.

The sensing of current by the current sensor 38 is conveyed to the microprocessor 47 through an isolation circuit 55. A current pulse is detected when the current (in either direction) sensed by current sensor 38 rises through a predetermined threshold. The microprocessor 47 interprets this and conveys the appropriate information to the control unit 14 (FIG. 1a) via the Tx line and the RS232 connector 35.

A preferred protocol for the operation of the system of this invention is illustrated in FIGS. 2a-d. Normally, the daughterboards 19a, b impress a square wave 53 alternating between +40 V (A positive with respect to B) and −40 V (B positive with respect to A) across their respective outputs A and B at a 60 Hz rate. This provides a square-wave power supply (FIG. 2a) to all the decoders 26, 28 along the cable 20. As pointed out below, the decoders 26, 28 can use power of either polarity. Because the time of the circuit at one polarity is equal to its time at the other polarity, no electrolysis problem is generated.

Figure 2A:
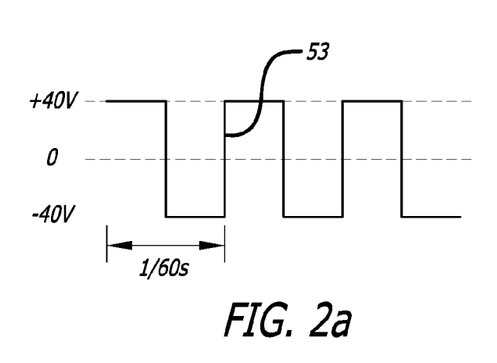
FIG. 2a is a time-amplitude diagram showing the voltage on the cable while no commands are being transmitted.
Figure 2B:
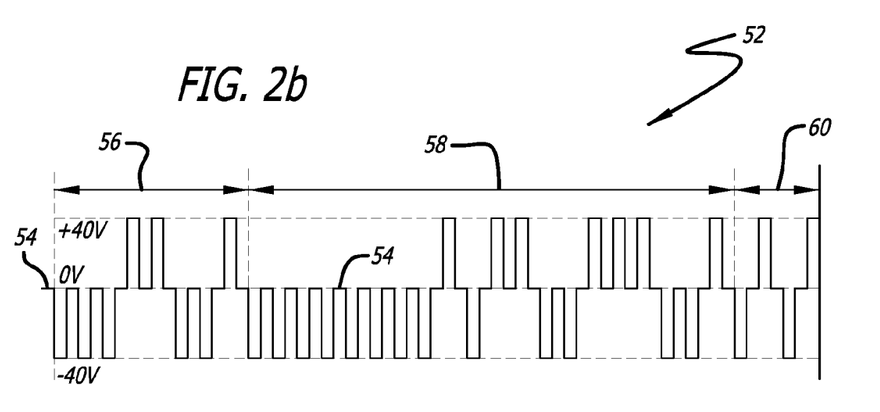
FIG. 2b is a time-amplitude diagram showing the voltage on the cable during the transmission of a command pulse train.
Figure 2C:
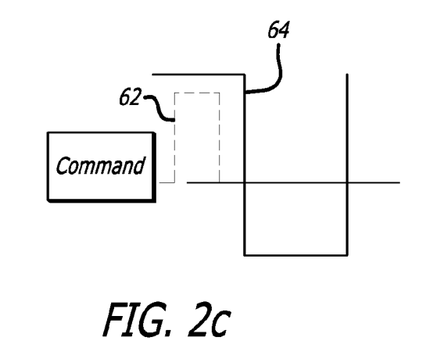
FIG. 2c is a time-amplitude diagram showing the voltage and current on the cable following a water valve solenoid operating command.
Figure 2D:
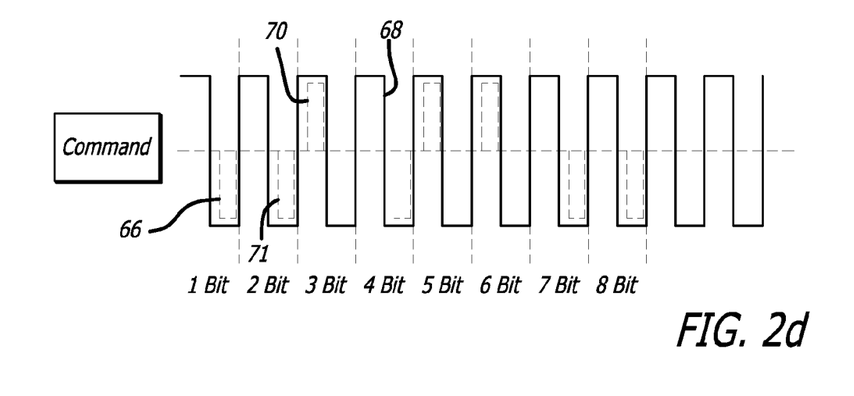
FIG. 2d is a time-amplitude diagram showing the voltage and current on the cable following a sensor interrogation command.

If it is now desired to actuate a specific sprinkler or sensor, the command pulse train 52 shown in FIG. 2b is transmitted. The command train begins with a no-power segment 54 in which the wires A and B are both grounded for 1/120 second. This is followed, in the preferred embodiment, by eight pulses 56 separated by similar no-power segments or delimiters 54. The pulses 56 may be either +40 V (signifying a "1") or −40 V (signifying a "0"). Taken together, the pulses 56 define the desired runtime (in minutes) of the device now to be selected.

The next twenty pulses 58, again separated by no-power delimiters 54, define the address of the desired device 26 or 28. Next, the nature of the desired command is specified by the four pulses 60. The command pulse train 52 illustrated in FIG. 2b may, for example, convey the command "Turn Station 3 of decoder 2873 on for 25 minutes". Upon completion of the command pulse train, the microprocessor 46 of FIG. 1b returns control of the wires A and B to the power relays 40, 42. The output of gateway 16 thus resumes the square-wave format of FIG. 2a.

If a selected decoder 26 has received and understood the command (see FIG. 2c), it momentarily draws a high current burst 62 during the +40 V portion of the first square wave 64 following the command pulse train. This is detected by the current sensor 38 of gateway 16 and constitutes an acknowledgement that the decoder has received its instruction. If no current is detected during the first square wave 64, a control failure is indicated, and the microprocessor 46 may transmit an alarm to the control device 14.

If the addressed device was a sensor decoder 28 (see FIG. 2d), the chosen decoder responds with current bursts 66 during the eight (in the preferred embodiment) square waves 68 following the command train. In each of these square waves, a current burst 70 during the +40 V portion transmits a "1" to the gateway 16, while a current burst 70 during the −40 V portion transmits a "0". As in the case of a station decoder 26, the lack of any current burst during a square wave 68 indicates a system failure and may trigger an alarm.

An examination of FIGS. 2a-d will show that in the preferred embodiment, a complete command and response cycle requires a little more than one second. Consequently, the described system can execute about fifty commands per minute.

Figure 3A:
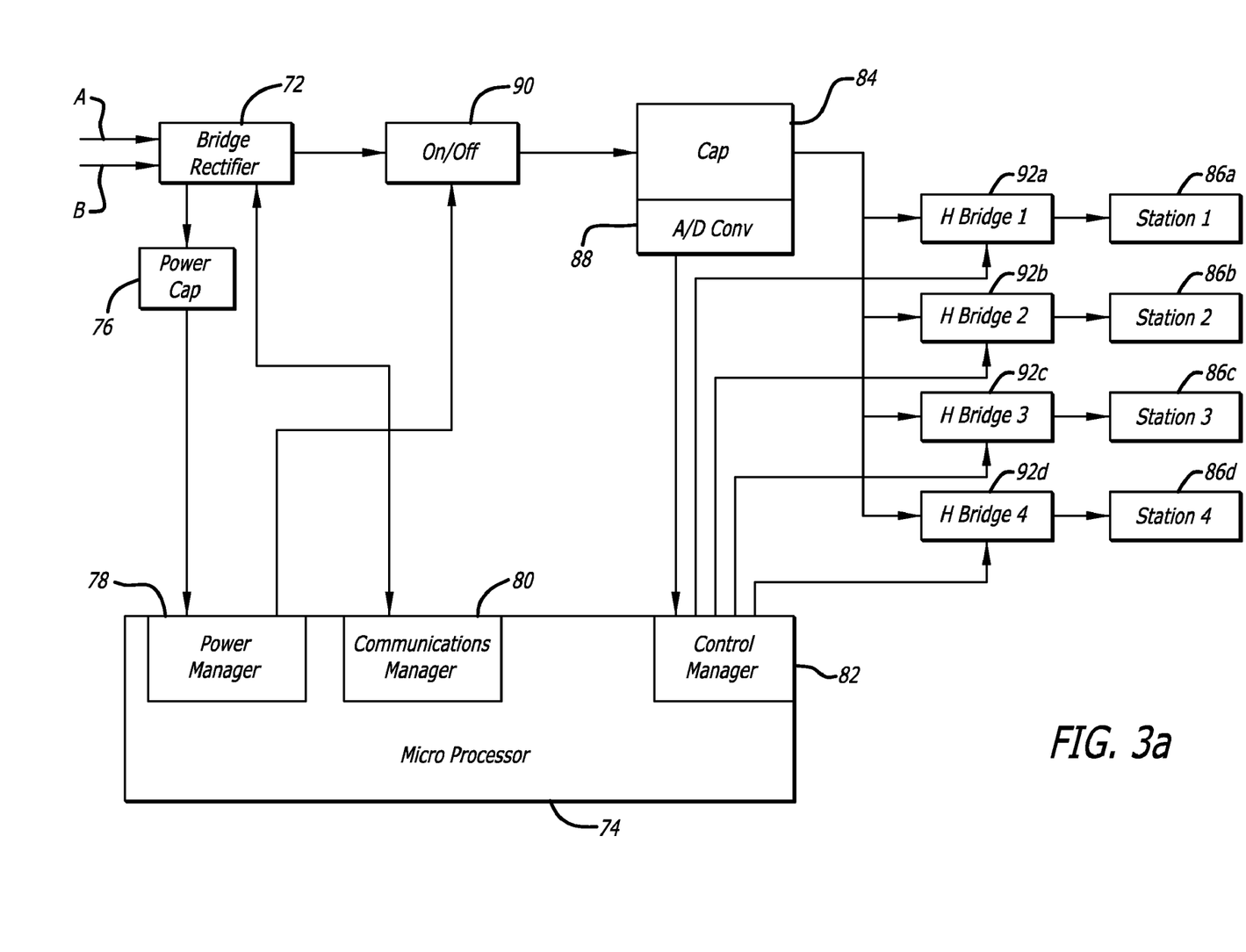
FIG. 3a is a block diagram of a watering station decoder.

FIG. 3a illustrates a station decoder 22 used in the system of this invention. The power and communication signals from the gateway of FIG. 1b appearing on wires A and B are applied to a bridge rectifier 72 that rectifies the incoming signals and conditions them to be interpreted by the microprocessor 74. A power capacitor 76 is continually charged by the rectified power and communication signals in order to provide operating power to the microprocessor 74 through the no-power intervals 54 (FIG. 2b), and long enough to perform an orderly shutdown in the event of a power failure.

The microprocessor 74 includes three subprocessors: the power manager 78, the communications manager 80, and the control manager 82. The power manager 78 controls the charging of the actuating capacitor 84 whose discharge, under the control of control manager 82, operates the station (i.e. watering valve) solenoids 86a-d in the manner described below in connection with FIG. 3b. An A/D converter 88 converts the charge level of the actuating capacitor 84 into a digital signal to allow control manager 82 to monitor the charge level of capacitor 84. The power manager 78 controls the charging of capacitor 84 from the bridge rectifier 72 through an on/off switch 90 under the guidance of control manager 82.

The communications manager 80 interprets any communication signals that appear at the bridge rectifier 72, enables the bridge rectifier 72 to provide power to the on/off switch 90 if it determines the decoder 22 to have been selected, and informs the control manager 82 of the desired action. The communications manager 80 also controls the current drawn from wires A and B by the bridge rectifier 72 so as to produce the above-mentioned current burst 62 (FIG. 2c) that acknowledges receipt of a command to the gateway 16. The microprocessor 74 generates the current burst 62 by transmitting a pulse 87 (FIG. 3c) which causes the output of bridge rectifier 72 to be momentarily bridged by a low-impedance resistor 89 through the source-drain circuit of transistor 91.

The control manager 82, pursuant to instructions from the communications manager 80, operates triac output stages 92a-d to actuate the solenoids 86a-d and determines whether the solenoids 86a-d are to be turned on or off. Its function is shown in more detail in FIG. 3b, in which input 100 denotes the operating power from bridge rectifier 72. Input 102 is the on/off signal from power manager 78, with transistor 104 being driven by the on/off switch 90. When switch 90 is on, power from input 100 can flow into the actuating capacitor 84 through transistor 104. The voltage on capacitor 84 is monitored by the A/D converter 88 connected to output 106.

Figure 3B:
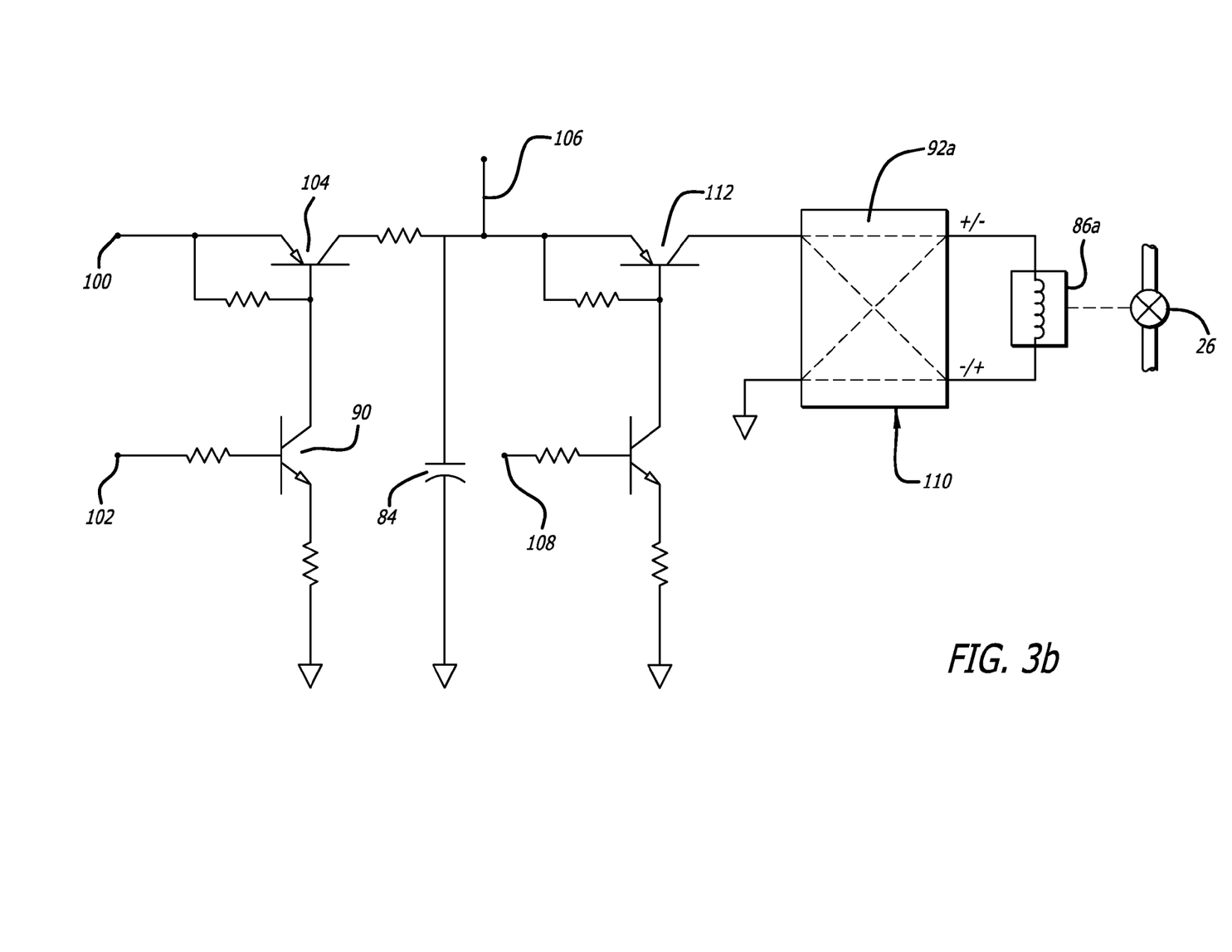
Figure 3C:
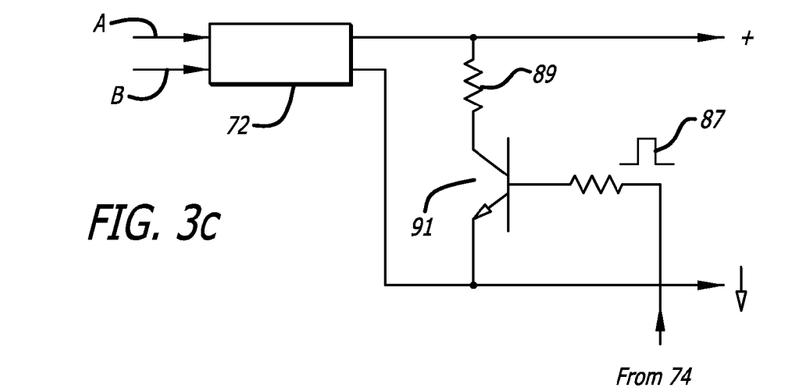
FIG. 3c is a partial circuit diagram showing the generation of a current burst.

When the solenoid 86a is to be actuated, either by a received command or by the expiration of a runtime interval stored in the microprocessor 74 by pulses 56 (FIG. 2b), the control manager 82 causes power manager 78 to turn off switch 90 so as to block transistor 104, and applies power to input 108. At the same time, the control manager 82 uses input 110 to switch triac bridge 92a to the desired output polarity for turning the water valve 26 on or off. The capacitor 84 now discharges through the transistor 112 and the solenoid 86a, opening or closing the water valve 26 depending upon the polarity of the output of triac bridge 92a. The triac bridge 92a also provides some degree of surge protection to the solenoid 86a.

Following an actuation of the solenoid 86a, the control manager 82 removes power from input 108 and directs the power manager 78 to turn switch 90 back on to recharge capacitor 84. The control manager 82 will not execute an actuation command until the charge on capacitor 84 is back to a sufficient level. If a power failure occurs, the power manager, which continuously monitors the presence of power at the bridge rectifier 72, causes the control manager 82 (which remains powered for a while by the power capacitor 76) to immediately go through a closing routine of all the water valves 26 as described above.

Figure 4:
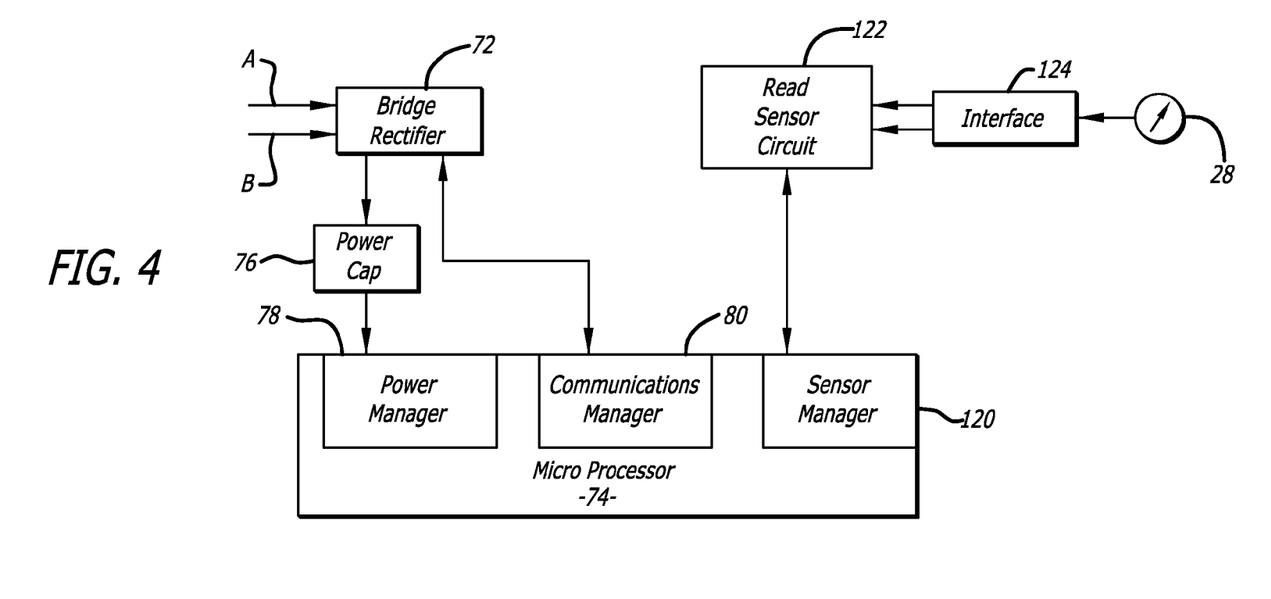
FIG. 4 is a block diagram of a sensor decoder.

FIG. 4 illustrates a sensor decoder 24 according to the invention. The bridge rectifier 72, microprocessor 74, power capacitor 76, power manager 78 and communications manager 80 serve the same functions as in the station decoder described above in connection with FIG. 3a. In the sensor decoder 24, however, the control monitor 82 of FIG. 3a is replaced by a sensor manager 120. The sensor manager 120, when so commanded by the communications manager 80, causes a sensor read circuit 122 to read and condition the sensor data which is continuously transmitted by the sensor 28 to the interface 124. The interface 124 preferably contains surge components and, if appropriate, A/D conversion circuitry.

The data received by the sensor manager 120 is conveyed to the communication manager 80 and is used by it to produce the current bursts 66 (FIG. 2d) that transmits the data to the gateway 16.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method of providing power and communications to a plurality of remotely controllable devices over a single pair of wires in a control system, comprising the steps of:
   connecting to said pair of wires a plurality of devices selectably actuatable to perform a predetermined function in response to an identification and action code;
   transmitting over said pair of wires direct current power pulses of alternating polarity for powering said devices; each of said power pulses having a first width and either a first polarity or a second polarity; each of said power pulses delimited from each other by a no-power segment;
   actuating a selected one of said devices by transmitting said identification and action code over said pair of wires in the form of a train of communication pulses that have said first polarity for logic 1, and said second polarity for logic 0; and
   causing said selected device to acknowledge receipt of said code or transmit data in response thereto by selectively drawing current in the presence of a transmitted pulse of predetermined polarity.

2. The method of claim 1, in which said control system is an irrigation control system, said devices are solenoids arranged to actuate water valves, and said predetermined function is the opening and/or closing of said water valves.

3. The method of claim 2, in which said water valves are latching solenoid devices requiring no power to remain open, said water valves being opened and closed in response to said pulses.

4. The method of claim 3, in which said water valves are automatically forced to the closed position in the absence of said pulses.

5. The method of claim 1, in which said control system is an irrigation system, said devices are sensors, and said predetermined function is the transmission of sensed data.

6. Apparatus for simultaneously powering and controlling selected components of an irrigation system over a single pair of wires, comprising:
 a) a plurality of decoders connected to said wires and arranged to be powered by a potential thereon; and
 b) a communication system for selectively bringing a first of said wires to a positive potential, a negative potential, or an equal potential with respect to the other of said wires;
 c) said decoders being responsive to predetermined sequences of said potentials to actuate system components connected thereto; said predetermined sequences of potentials communicating a plurality of data bits based on a level and polarity of each of said potentials;
 d) wherein control information is transmitted to said decoders by transmitting a series of potential pulses separated by intervals of equal potential on said wires, the polarity of said potential pulses defining a "1" or a "0".

7. The apparatus of claim 6, in which said decoders are powered by a potential difference between said wires regardless of the polarity of that potential difference.

8. The apparatus of claim 6, in which said wires are subjected to pulses of alternating positive and negative potential with respect to each other in the form of a square wave while no control information is being transmitted to said decoders.

9. The apparatus of claim 8, in which said decoders are arranged to return status information and/or data to said means by momentarily drawing a high current during predetermined pulses of said square wave.

10. The apparatus of claim 9, in which the high current draw is produced by momentarily operationally interconnecting said wires through a low impedance.

11. The apparatus of claim 8, in which said decoders are sensor decoders, and said sensor decoders are arranged to transmit data by drawing high current bursts during said square wave pulse sets following a command pulse train, the binary value of each data bit being defined by the polarity of the pulse during which said current burst occurs.

12. The apparatus of claim 6, in which said potential pulses provide a code defining the address of the selected decoder and the nature of the desired control.

13. The apparatus of claim 12, in which said code further defines the desired watering runtime for a watering station decoder, thereby causing said decoder to automatically shut off the water a selected time after a turn-on command.

14. The apparatus of claim 6, in which said decoders are watering station decoders that acknowledge receipt of a command by drawing a high current burst during a predetermined pulse following a command pulse train.

15. The apparatus of claim 6, in which said decoders are watering station decoders, and said system components are latching water valve solenoids, said decoders being arranged to force said water valves to the "off position in the event of a power failure.

16. The apparatus of claim 6, in which said decoders are watering station decoders, and said system components are latching water valve solenoids, said solenoids being actuated by the discharge of a capacitor therethrough.

17. The apparatus of claim 16, in which the discharge of said capacitor is routed through a bridge which can be controlled to selectively change the direction of the current flow of the discharge of said capacitor through said solenoid.

18. The apparatus of claim 16, in which said capacitor is continuously charged between actuations of said solenoid.

* * * * *